United States Patent
Shin

(10) Patent No.: US 9,485,402 B2
(45) Date of Patent: Nov. 1, 2016

(54) IMAGING APPARATUS, OPERATION CONTROL TERMINAL DEVICE, OPERATION CONTROL SYSTEM AND COMPUTER READABLE MEDIUM FOR OPERATION CONTROL

(71) Applicant: RICOH IMAGING COMPANY, LTD., Tokyo (JP)

(72) Inventor: Takeharu Shin, Saitama (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 0 days.

(21) Appl. No.: 14/511,934

(22) Filed: Oct. 10, 2014

(65) Prior Publication Data

US 2015/0103196 A1   Apr. 16, 2015

(30) Foreign Application Priority Data

Oct. 11, 2013   (JP) .................................. 2013-213747

(51) Int. Cl.
*H04N 5/232*      (2006.01)
*H04N 5/247*      (2006.01)

(52) U.S. Cl.
CPC ...... *H04N 5/23203* (2013.01); *H04N 5/23216* (2013.01); *H04N 5/247* (2013.01)

(58) Field of Classification Search
CPC ..................... H04N 5/23203; H04N 5/23216; H04N 5/247
See application file for complete search history.

(56) References Cited

U.S. PATENT DOCUMENTS

| 4,992,883 A | * | 2/1991 | Tsunekawa | .......... | H04N 1/2112 348/E5.037 |
| 2002/0013863 A1 | * | 1/2002 | Kitagawa | ................ | H04N 5/232 710/5 |
| 2007/0040894 A1 | * | 2/2007 | Kikugawa | .......... | H04N 1/00249 348/14.01 |
| 2009/0233643 A1 | * | 9/2009 | Nishimura | ............. | G08C 23/04 455/559 |
| 2011/0050925 A1 | * | 3/2011 | Watanabe | .......... | H04N 5/23203 348/211.2 |
| 2011/0052165 A1 | * | 3/2011 | Watanabe | ............... | G03B 17/00 396/56 |
| 2011/0115932 A1 | * | 5/2011 | Shin | ....................... | H04N 5/232 348/211.4 |
| 2013/0201357 A1 | * | 8/2013 | Watanabe | .......... | H04N 5/23203 348/211.2 |

FOREIGN PATENT DOCUMENTS

| JP | 2011-050017 | 3/2011 |
| JP | 2012-063575 | 3/2012 |

* cited by examiner

*Primary Examiner* — Amy Hsu
(74) *Attorney, Agent, or Firm* — Frommer Lawrence & Haug LLP

(57) ABSTRACT

An imaging apparatus, comprising: a communication unit configured to communicate with an external device; an operation control unit configured to control execution of predetermined operation concerning photographing in accordance with a control signal received from the external device; and a detection unit configured to detect disconnection of communication with the external device, wherein the operation control unit is configured to control execution of the predetermined operation in accordance with a predetermined operation control setting when disconnection of the communication with the external device is detected during execution of the predetermined operation.

15 Claims, 4 Drawing Sheets

IMAGING APPARATUS, OPERATION CONTROL TERMINAL DEVICE, OPERATION CONTROL SYSTEM AND COMPUTER READABLE MEDIUM FOR OPERATION CONTROL

BACKGROUND OF THE INVENTION

The present invention relates to an imaging apparatus capable of executing a predetermined operation regarding photographing, and to an operation control terminal device, an operation control system and a computer readable medium for operation control for controlling the predetermined operation executed by the imaging apparatus.

A system for remotely operating an imaging apparatus, such as a camera, is known. For example, Japanese Patent Provisional Publication No. 2011-50017A (hereafter, referred to as patent document 1) describes a concrete configuration of a system where a master camera remotely controls a slave camera.

In patent document 1, the maser camera transmits a photographing preparation and start command to a plurality of slave cameras by broadcast or multicast, and transmits a photographing end command to each slave camera by unicast. The master camera repeats transmitting the photographing end command by unicast until a response is received form a slave camera of which response has not been received. By repeatedly transmitting the photographing end command by unicast to enable the slave camera to receive the photographing end command, a photographing operation being executed on the slave camera is terminated.

SUMMARY OF THE INVENTION

The system described in patent document 1 is configured on the assumption that communication between a master camera and a slave camera successfully continues. Let us consider a case where, in the system described in patent document 1, communication between the master camera and the slave camera is disconnected, by way of example. In this case, the slave camera would not receive the photographing end command even when the maser camera transmits the photographing end command many times, which causes a problem that the photographing operation executed on the slave camera would not be terminated.

The present invention is advantageous in that it provides at least one of an imaging apparatus, an operation control terminal device, an operation control system and a computer readable medium for operation control capable of controlling execution of the operation by the imaging apparatus even when communication between the imaging apparatus and a device for controlling execution of the operation by the imaging apparatus is disconnected.

According to an aspect of the invention, there is provided an imaging apparatus, comprising: a communication unit configured to communicate with an external device; an operation control unit configured to control execution of predetermined operation concerning photographing in accordance with a control signal received from the external device; and a detection unit configured to detect disconnection of communication with the external device. The operation control unit is configured to control execution of the predetermined operation in accordance with a predetermined operation control setting when disconnection of the communication with the external device is detected during execution of the predetermined operation.

According to the above described configuration, even when the imaging apparatus is in the state where communication with the external device is disconnected and thereby the imaging apparatus is not able to receive the control signal from the external device, execution of the predetermined operation concerning photographing can be controlled.

The imaging apparatus may further comprise an operation unit configured to receive a user operation for setting the predetermined operation control setting.

The imaging apparatus may further comprise a storage medium in which the predetermined operation control setting has been stored in advance.

When the communication with the external device is valid, the operation control unit may operate to start the predetermined operation in accordance with a start command for the predetermined operation received from the external device, and to terminate execution of the predetermined operation in accordance with an end command for the predetermined operation received from the external device. When the communication with the external device is disconnected during execution of the predetermined operation, the operation control unit may operate to terminate execution of the predetermined operation after executing the predetermined operation in accordance with the predetermined operation control setting for a predetermined time period.

According to another aspect of the invention, there is provided an operation control terminal device for controlling execution of predetermined operation by an imaging apparatus. The operation control terminal device comprises: a communication unit configured to communicate with the imaging apparatus; a display unit configured to display a setting screen for an operation control setting used to control execution of the predetermined operation by the imaging apparatus when, on the imaging apparatus, disconnection of communication with the operation control terminal device is detected during execution of the predetermined operation; and an operation unit configured to receive a user operation to the setting screen for the operation control setting displayed on the display unit. The communication unit is configured to cause the imaging apparatus to set the operation control setting by transmitting, to the imaging apparatus, an operation result of the user operation to the setting screen for the operation control setting displayed on the display unit.

According to the above described configuration, even when the imaging apparatus is in the state where communication with the operation control terminal device is disconnected and thereby the imaging apparatus is not able to receive the control signal from the operation control terminal device, execution of the predetermined operation concerning photographing can be controlled.

The operation control setting may cause the imaging apparatus to terminate execution of the predetermined operation after executing the predetermined operation for a predetermined time period when, on the imaging apparatus, disconnection of the communication with the operation control terminal device is detected during execution of the predetermined operation.

According to another aspect of the invention, there is provided a non-transitory computer readable medium having computer readable instruction stored thereon, which, when executed by a processor of a device for controlling execution of predetermined operation by an imaging apparatus, configures the processor to perform: displaying a setting screen for an operation control setting used to control execution of the predetermined operation by the imaging apparatus when, on the imaging apparatus, disconnection of communication with an external device is detected during execution of the predetermined operation; and setting the operation control setting in accordance with a user operation to the setting screen for the operation control setting.

According to the above described configuration, even when the imaging apparatus is in the state where communication with the external device is disconnected and thereby the imaging apparatus is not able to receive the control signal from the external device, execution of the predetermined operation concerning photographing can be controlled.

The operation control setting may cause the imaging apparatus to terminate execution of the predetermined operation after executing the predetermined operation for a predetermined time period when disconnection of the communication with the external device is detected during execution of the predetermined operation.

According to another aspect of the invention, there is provided an operation control system, comprising: an operation control setting server; an operation control terminal device; and an imaging apparatus. The operation control setting server comprise: a predetermined operation control setting content. The operation control terminal device comprises: a display unit configured to receive the predetermined operation control setting content from the operation control setting server and display the predetermined operation control setting content; an operation unit configured to receive a user operation to the predetermined operation control setting content displayed by the display unit; and a transmission unit configured to transmit, to the imaging apparatus, an operation result with respect to the predetermined operation control setting content. The imaging apparatus comprises: an operation control unit configured to control execution of predetermined operation concerning photographing in accordance with a control signal received from the operation control terminal device; and a setting unit configured to set predetermined operation control setting in accordance with the operation result with respect to the predetermined operation control setting content received from the operation control terminal device. In this configuration, the operation control unit is configured to control execution of the predetermined operation in accordance with the predetermined operation control setting when disconnection of communication with the operation control terminal device is detected during execution of the predetermined operation.

According to the above described configuration, even when the imaging apparatus is in the state where communication with the operation control terminal device is disconnected and thereby the imaging apparatus is not able to receive the control signal from the operation control terminal device, execution of the predetermined operation concerning photographing can be controlled.

The operation control setting server may be provided in the imaging apparatus.

The predetermined operation control setting may cause the imaging apparatus to terminate execution of the predetermined operation after executing the predetermined operation for a predetermined time period when, on the imaging apparatus, disconnection of the communication with the operation control terminal device is detected during execution of the predetermined operation.

In the above described aspects of the invention, the predetermined operation may comprise consecutive photographing operation, bulb photographing operation and moving image photographing operation.

BRIEF DESCRIPTION OF THE ACCOMPANYING DRAWINGS

DETAILED DESCRIPTION OF THE EMBODIMENTS

Hereinafter, an operation control system according to an embodiment of the invention is described with reference to the accompanying drawings. In the following, an operation control system including a digital single lens reflex camera and a smartphone is described as the embodiment of the invention. It should be noted that the digital single lens reflex camera provided in the operation control system may be replaced with another type of electronic device having the imaging function, such as, a mirrorless single lens camera, a compact digital camera, a camcorder, a tablet terminal, a PHS (Personal Handy Phone System), a smartphone, a feature phone and a portable game machine. The smartphone provided in the operation control system may be replaced with another type of electronic device having the function as a user interface, such as, a digital single lens reflex camera, a mirrorless single lens camera, a compact digital camera, a camcorder, a tablet terminal, a PHS, a feature phone, a portable game machine, a desktop PC (Personal Computer) and a notebook PC.

Configuration of Operation Control System

Figure 1:
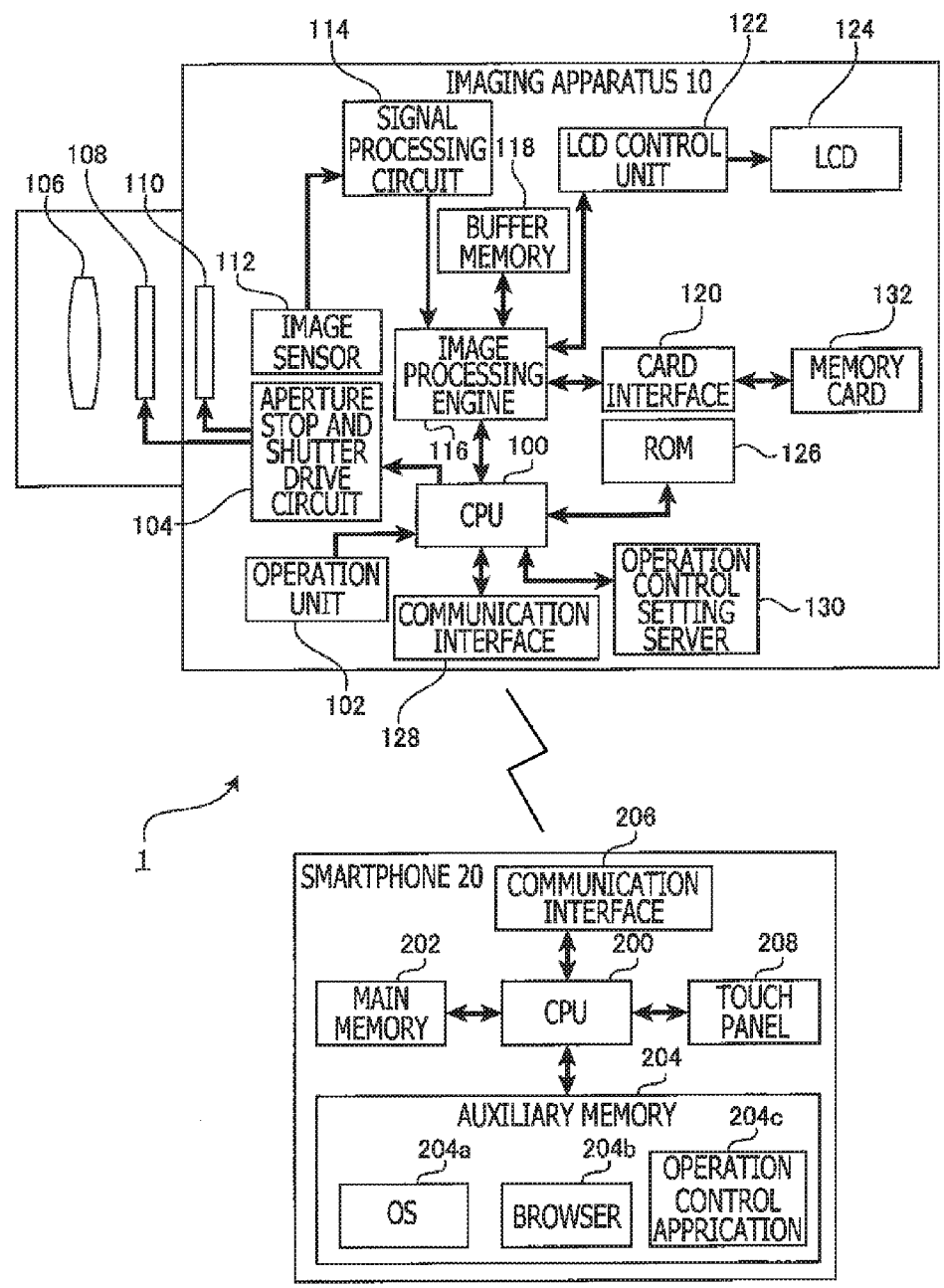
FIG. 1 is a block diagram illustrating an operation control system according to an embodiment of the invention.

FIG. 1 is a block diagram illustrating an operation control system 1 according to the embodiment of the invention. As shown in FIG. 1, the operation control system 1 includes an imaging apparatus 10 and a smartphone 20.

Configuration of Imaging Apparatus

As shown in FIG. 1, the imaging apparatus 1 includes a CPU (Central Processing Unit) 100, an operation unit 102, an aperture stop and shutter drive circuit 104, an imaging lens 106, an aperture stop 108, a shutter 110, an image sensor 112, a signal processing circuit 114, an image processing engine 116, a buffer memory 118, a card interface 120, an LCD (Liquid Crystal Display) control circuit 122, an LCD 124, a ROM (Read Only Memory) 126, a communication interface 128 and an operation control setting server 130.

The operation unit 102 includes various switches for operating the imaging apparatus 10, such as, a power switch, a release switch and an imaging mode switch. When the power switch is pressed by a user, power is supplied to various circuits of the imaging apparatus 10 from a battery (not shown) via a power line. After the power is supplied, the CPU 100 accesses the ROM 126 to load a control program into an internal memory (not shown), and controls totally the imaging apparatus 10 by executing the control program.

The CPU 100 drives and controls the aperture stop 108 and the shutter 110 via the aperture stop and shutter drive circuit 104 so that appropriate exposure is obtained based on a photometric value measured by a TTL (Through The Lens) metering provided in the imaging apparatus 10. More specifically, drive and control for the aperture stop 108 and the shutter 110 is executed based on the AE function designated by the imaging mode switch, such as, a program AE (Automatic Exposure), a shutter speed priority AE and an aperture priority AE. Further, the CPU 100 executes AF (Autofocus) control together with the AE control. The AF control includes an active method, a phase difference detection method and a contrast detection method. Since these types of AE and AF functions are known, detailed explanations thereof are omitted.

A light beam from a subject is received by the image sensor 112 after passing through the imaging lens 106, the aperture stop 108 and the shutter 110. The image sensor 112 is, for example, a CCD (Charge Coupled Device) image sensor or a CMOS (Complementary Metal Oxide Semiconductor) image sensor, and is configured to accumulate charges in response to the light amount of an optical image formed on each pixel of an imaging surface thereof, to convert the accumulated charges into an electric signal, and to output the electric signal to the signal processing circuit 114. The signal processing circuit 114 executes predetermined signal processing for the electric signal (image data) inputted from the image sensor 112, and outputs the processed signal to the image processing engine 116.

The image processing engine 116 executes predetermined signal processing, such as, color interpolation, a matrix operation, and Y/C separation, generates a luminance signal Y and color difference signals Cb and Cr, and compresses the processed signal in a predetermined format, such as JPEG (Joint Photographic Experts Group). The buffer memory 118 is used as a storage space for temporarily store processing data used during execution of processes by the image processing engine 116.

To a card slot of the card interface 120, a memory card 132 is detachably attached. The image processing engine 116 is able to communicate with the memory card 132 via the card interface 120. The image processing engine 116 stores the compressed image signal (an image file) in the memory card 132.

The image processing engine 116 executes predetermined signal processing for the signal which has been subjected to the Y/C separation, and buffers the processed signal in a frame memory (not shown) by the frame. The image processing engine 116 sweeps out the buffered signal from each frame memory at predetermined timings, converts the signal into a video signal in a predetermined format, and outputs the video signal to the LCD control circuit 122. The LCD control circuit 122 executes modulation control for the LCD based on the signal input from the image processing engine 116. As a result, an image (i.e., a picked up image) of the subject is displayed on the LCD 124. Thus, the user is able to view a real time through image obtained at appropriate intensity and focus based on the AE control and AF control through the LCD 124.

Configuration of Smartphone

As shown in FIG. 1, the smartphone 20 includes a CPU 200, a main memory 202 such as a RAM (Random Access Memory), an auxiliary memory 204 such as a flash memory, a communication interface 206 and a touch panel 208.

After the smartphone 20 is turned ON, the CPU 200 accesses the required hardware. Immediately after power ON of the smartphone 20, the CPU 200 accesses the auxiliary memory 204 to load an OS (Operating System) 204a into the main memory 202 and starts an OS 204a. Thereafter, various processes by the smartphone 20 are executed through cooperation between the CPU 200 and the OS 204a. For example, in the auxiliary memory 204, various types of applications such as a browser 204b have been stored. Each application program runs under control of the OS 204a which manages resources and processes.

The browser 204b is, for example, a web browser capable of interpreting an HTML (Hyper Text Markup Language), a CSS (Cascading Style Sheets), a JavaScript™ and related specifications. The browser 204b generates a request message complying with HTTP (Hypertext Transfer Protocol), accesses a URL (Uniform Resource Identifier) designated, for example, by a user, and downloads contents such as a web page. The browser 204b executes processing such as interpretation of the downloaded HTML contents, and generates a DOM (Document Object Model) tree, a layout tree and the like. The browser 204b executes sequentially rendering in an image buffer in the main memory 202 for elements of the contents for which a layout is determined. The contents rendered in the image buffer are transferred to a VRAM (Video Random Access Memory) (not shown). By transferring a result of the rendering to the VRAM, the contents are displayed on the touch panel 208. The user is able to conduct various types of user operations to the contents displayed on the touch panel 208, such as, input by pen-touch or finger-touch, screen scroll by a flick operation (a sweeping operation on a screen by a finger), or zooming-in/zooming-out by a pinching operation (expanding or reducing an interval between two fingers).

Operation Control Flow

Figure 2A:
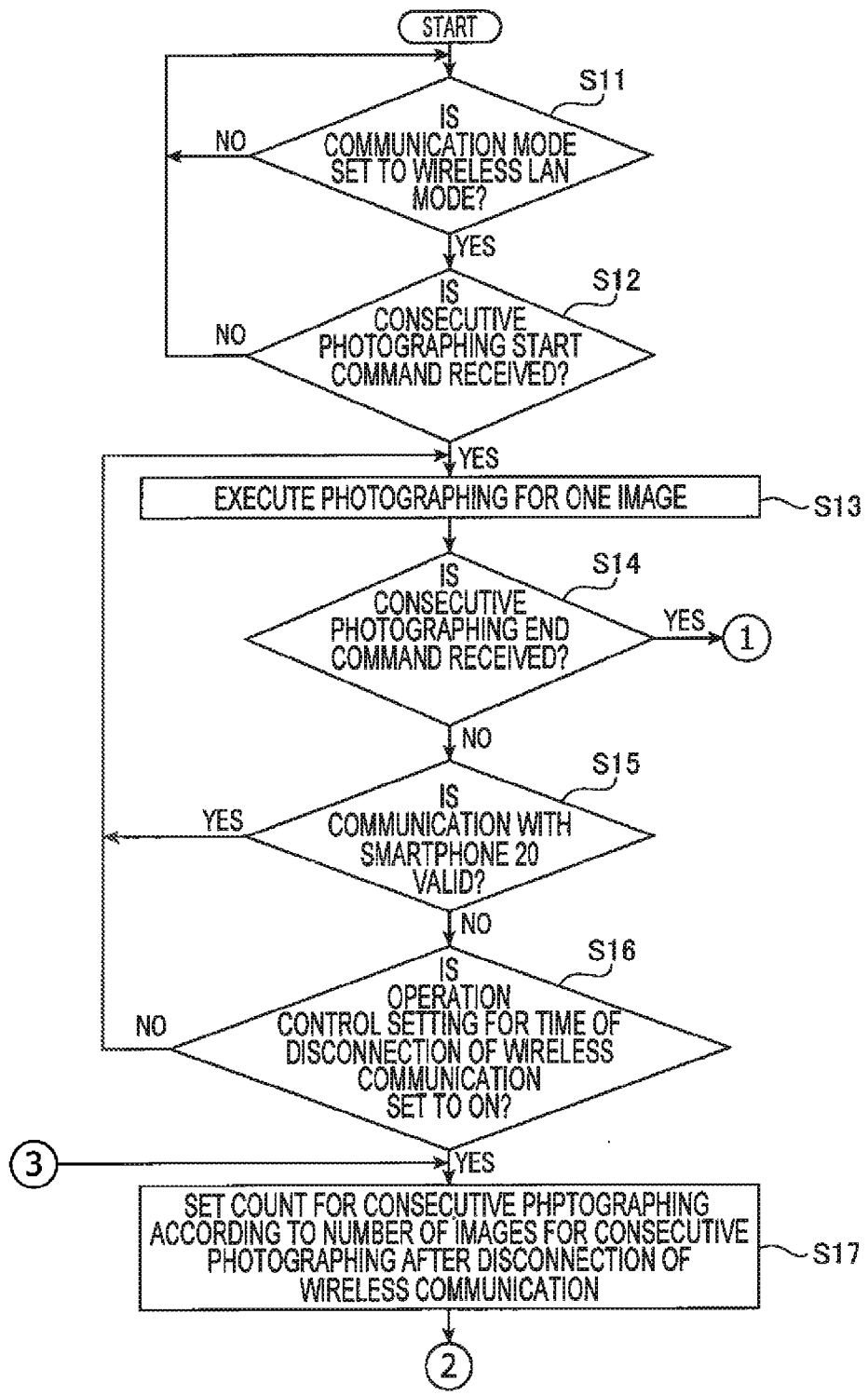
FIGS. 2A and 2B illustrate a flowchart of an operation control process according to the embodiment of the invention.
Figure 2B:
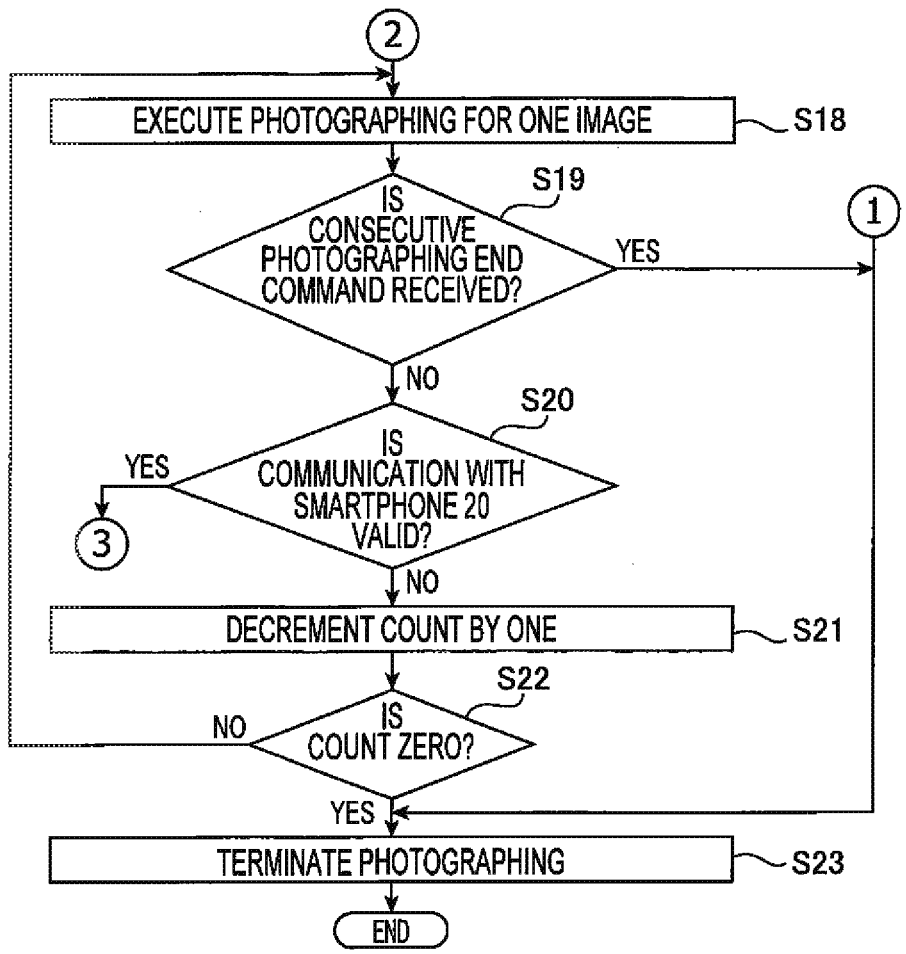

Hereafter, an operation control process executed on the imaging apparatus 10 is explained. FIGS. 2A and 2B illustrate a flowchart of the operation control process according to the embodiment of the invention. The operation control process shown in FIGS. 2A and 2B is started when the imaging apparatus is turned ON. In the auxiliary memory 204 of the smartphone 20, an operation control application 204c for controlling the operation of the imaging apparatus 10 has been installed. The operation of the imaging apparatus 10 controlled by the operation control application 204c includes, for example, consecutive photographing operation, bulb photographing operation and moving image photographing operation.

By way of example, FIGS. 2A and 2B show control for the consecutive photographing operation by the operation control application 204c. When a user conducts a finger-touch operation to a consecutive photographing operation switch provided by the operation control application 204c, a consecutive photographing start command is transmitted from the smartphone 20 to the imaging apparatus 10. In the case where the consecutive photographing operation switch is a momentary type, when the user detaches the user's finger from the consecutive photographing operation switch, a consecutive photographing end command is transmitted from the smartphone 20 to the imaging apparatus 10. In the case where the consecutive photographing operation switch is an alternate type, when the user conducts again the finger-touch operation to the consecutive photographing operation switch, the consecutive photographing end command is transmitted from the smartphone 20 to the imaging apparatus 10.

S11 in FIG. 2A (Check of Communication Mode)

Each of the imaging apparatus 10 (the communication interface 128) and the smartphone 20 (the communication interface 206) complies with the IEEE 802.11 standard, and is able to perform Wi-Fi communication. In this embodiment, the imaging apparatus 10 and the smartphone 20 communicate with each other through Wi-Fi communication; however, in another embodiment, the imaging apparatus 10 and the smartphone 20 may communicate with each other through another type of wireless communication protocol, such as Bluetooth™, IrDA or the like. In place of a wireless communication protocol, a wired communication protocol, such as a USB (Universal Serial Bus), may be used.

In step S11, it is determined whether the communication mode of the imaging apparatus 10 is set to a wireless LAN (Local Area Network) mode.

S12 in FIG. 2A (Wait for Receipt of Consecutive Photographing Start Command)

When the communication mode of the imaging apparatus 10 is set to the wireless LAN mode (S11: YES), the imaging apparatus 10 is connected to a wireless access point. In this case, the imaging apparatus 10 and the smartphone 20 belong to the same segment. Thus, the imaging apparatus 10 and the smartphone 20 become able to communicate with each other. Connection between the imaging apparatus 10 and the smartphone 20 is not limited to an infrastructure mode, but may be an ad hoc mode.

In step S12, the imaging apparatus 10 waits for receipt of the consecutive photographing start command transmitted from the smartphone 20.

S13 in FIG. 2A (Imaging Process)

When the consecutive photographing start command is received from the smartphone 20 (S12: YES), the process proceeds to step S13. In step S13, photographing of a subject is executed one time and an image file is generated. The generated image file is stored in the memory card 132.

S14 in FIG. 2A (Wait for Receipt of Consecutive Photographing End Command)

In step S14, the imaging apparatus 10 waits for receipt of the consecutive photographing end command transmitted from the smartphone 20. When the consecutive photographing end command transmitted from the smartphone 20 is received (S14: YES), the process proceeds to step S23 (end of consecutive photographing).

As described above, according to the embodiment, the imaging apparatus 10 operates (consecutive photographing/single photographing) in accordance with a consecutive photographing command or a single photographing command received from the smartphone 20 regardless of drive settings (consecutive photographing/single photographing) on the imaging apparatus 10 side. However, in another embodiment, when the imaging apparatus 10 receives a release command from the smartphone 20, the imaging apparatus 10 may operate (consecutive photographing/single photographing) in accordance with the drive setting on the imaging apparatus 10 side.

S15 FIG. 2A (Check of Wireless Connection State)

When the consecutive photographing end command is not received (S14: NO), the process proceeds to step S15. In step S15, the imaging apparatus determines whether the wireless communication between the imaging apparatus 10 and the smartphone 20 is valid.

In order to check validity of the wireless communication with the smartphone 20, the imaging apparatus 10 operates to periodically detect the smartphone 20. When the smartphone 20 is detected, the imaging apparatus 10 determines that the wireless communication with the smartphone 20 is valid (S15: YES), and the process returns to step S13. On the other hand, when the smartphone 20 is not detected, the imaging apparatus 10 determines that the wireless communication with the smartphone is not valid, and the process proceeds to step S16 (determination on whether to apply operation control setting when wireless communication is disconnected).

Preferably, when the smartphone 20 is not detected, on the screen of the operation control application 204c, the fact that the wireless communication with the imaging apparatus 1 is disconnected, a condition for automatically terminating the current consecutive photographing operation, countdown until automatic termination of the consecutive photographing operation, the fact that the automatic termination of the consecutive photographing operation is cancelled when the wireless communication is restored and the like are displayed. The time to be counted down corresponds to a time period elapsed until the imaging apparatus 10 moves to the state where the condition for automatic termination of the consecutive photographing is satisfied from a photographing operation state of the imaging apparatus 10 detected before disconnection of the wireless communication.

S16 in FIG. 2A (Determination on Whether to Apply Operation Control Setting when Wireless Communication is Disconnected)

In step S16, it is determined whether or not the operation control setting for the time of disconnection of wireless communication is applied.

Figure 3:
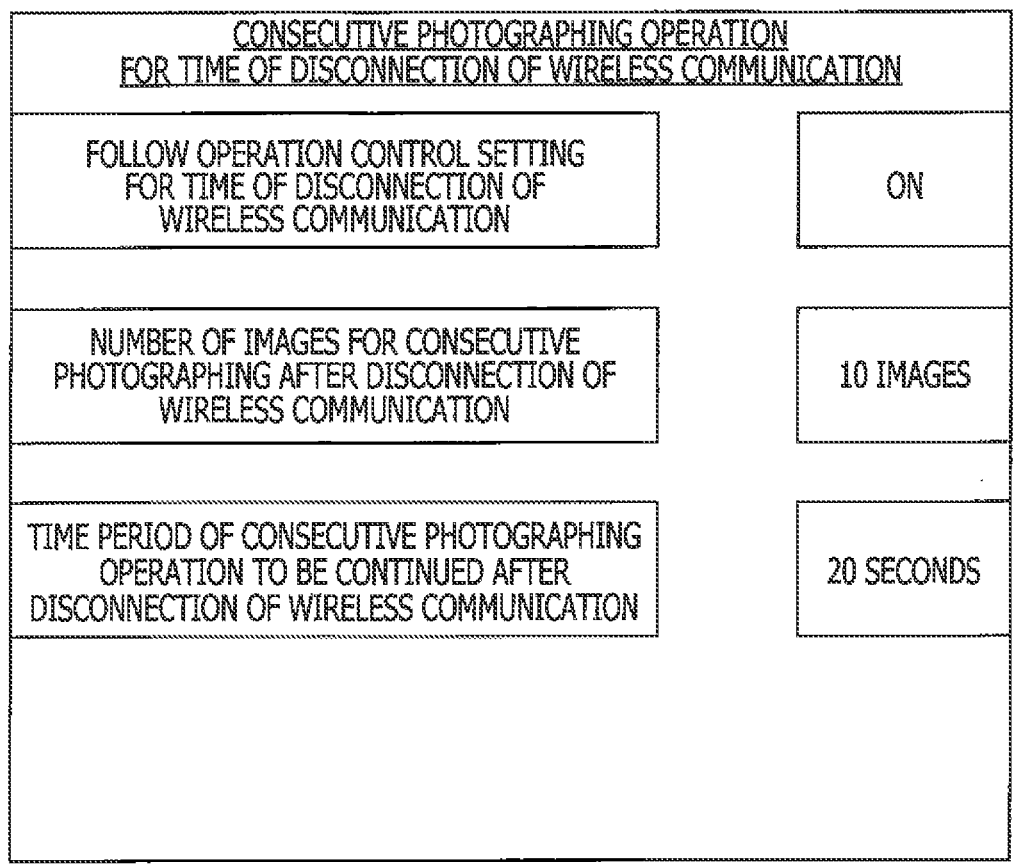
FIG. 3 illustrates a setting screen for an operation control setting displayed on an LCD of an imaging apparatus according to the embodiment of the invention.

Hereafter, two setting examples regarding the setting of the operation control setting at the time of disconnection of wireless communication are explained. FIG. 3 illustrates a setting screen for the operation control setting. In setting example 1, the setting screen for the operation control setting shown in FIG. 3 is displayed on the LCD 124 of the imaging apparatus 10. In setting example 2, the setting screen for the operation control setting is displayed on the touch panel 208 of the smartphone 20.

In each of the setting examples 1 and 2, the setting screen for the operation control setting is formed as a menu screen for setting the consecutive photographing operation during the disconnected state of wireless communication. On the setting screen for the operation control screen, messages "Follow the operation control setting for the time of disconnection of the wireless communication", "Number of images for consecutive photographing after disconnection of the wireless communication", and "Time Period of the consecutive photographing operation to be continued after disconnection of the wireless communication" are displayed in an aligned state. Regarding "Follow the operation control setting at the time of disconnection of the wireless communication", it can be set to ON or OFF. Regarding "Number of images for consecutive photographing after disconnection of the wireless communication", the number of images larger than or equal one can be set. Regarding "Time Period of the consecutive photographing operation to be continued after disconnection of the wireless communication", a time larger than or equal to 0 second can be set.

Setting Example 1

In setting example 1, the user is able to make settings for the operation control setting for the time of disconnection of wireless communication, by operating the setting screen on the LCD 1244 through the operation unit 102 of the imaging apparatus 10. That is, the user is able to input values to the respective items of "Follow the operation control setting for the time of disconnection of the wireless communication", "Number of images for consecutive photographing after disconnection of the wireless communication", and "Time Period of the consecutive photographing operation to be continued after disconnection of the wireless communication" by visually checking the setting screen displayed on the LCD 124.

Setting Example 2

In setting example 2, the user is able to make settings for the operation control setting for the time of disconnection of wireless communication, by operating the setting screen on the touch panel 208 of the smartphone 20. Specifically, the user starts the browser 204*b* and designates a predetermined URI. The designated URI is the operation control setting server (operation control setting contents) 130. When the imaging apparatus 10 and the smartphone 20 are connected in an ad hoc mode, the operation control setting server 130 may be automatically designated at the time when the browser 204*b* is started, for example.

By accessing the operation control setting server 130 from the browser 204*b*, the setting screen shown in FIG. 3 is displayed on the touch panel 208, the user is able to input values to the respective items of "Follow the operation control setting for the time of disconnection of the wireless communication", "Number of images for consecutive photographing after disconnection of the wireless communication", and "Time Period of the consecutive photographing operation to be continued after disconnection of the wireless communication" by visually checking the setting screen displayed by the browser 204*b*. Information regarding the set value of each item is uploaded to the operation control setting server 130. As a result, the operation control setting for the time of disconnection of wireless communication is set (or updated).

The operation control setting for the time of disconnection of wireless communication is not limited to settings set by a user operation, but may be, for example, predefined settings which have been written in the ROM 126 at the time of shipment of the imaging apparatus 10.

Turning to the explanation about the operation control process shown in FIGS. 2A and 2B, when "Follow the operation control setting for the time of disconnection of the wireless communication" is set to (S16: NO), the process returns to step S13. When "Follow the operation control setting for the time of disconnection of the wireless communication" is set to ON (S16: YES), the process proceeds to step S17 (set counter for consecutive photographing) to apply the operation control setting for the time of disconnection of wireless communication.

S17 in FIG. 2A (Set Counter)

In step S17, the counter for the consecutive photographing is set. The count value to be set is the number of images set for the "Number of images for consecutive photographing after disconnection of the wireless communication". For example, when the "Number of images for consecutive photographing after disconnection of the wireless communication" is set to 10, the count value is set to 10.

S18 in FIG. 2B (Photographing Process)

In step S18, photographing of the subject is executed one time, and an image file (a photographed image file) is generated. The generated image file is stored in the memory card 132.

S19 in FIG. 2B (Wait for Receipt of Consecutive Photographing End Command)

In step S19, the imaging apparatus 10 waits for the consecutive photographing end command transmitted from the smartphone 20. When the consecutive photographing end command transmitted by the smartphone 20 is received (S19: YES), the process proceeds to step S23.

S20 in FIG. 2B (Checking of Wireless Communication State)

When the consecutive photographing end command is not received (S19: NO), the process proceeds to step S20. In step S20, it is determined whether the communication between the imaging apparatus 10 and the smartphone 20 is valid.

When the smartphone 20 is detected, the imaging apparatus 10 determines that the wireless communication with the smartphone 20 is valid (S20: YES), and the process returns to step S17 to reset the counter for the consecutive photographing to the initial value (the number of images set for "Number of images for consecutive photographing after disconnection of the wireless communication"). In place of returning to step S17, the process may be configured to return to step S18 from step S20.

When the smartphone 20 is not detected, the imaging apparatus 10 determines that the wireless communication with the smartphone 20 is not valid (the wireless communication is disconnected) (S20: NO), and the process proceeds to step S21 (decrement of count).

S21 in FIG. 2B (Decrement Count)

In step S21, the count of the consecutive photographing is decremented by one.

S22 in FIG. 2B (Determination on Count)

In step S22, it is determined whether or not the count of the consecutive photographing is zero. When the count of the consecutive photographing is not zero (S22: NO), the process returns to step S19 and the consecutive photographing is continued. The consecutive photographing is executed at time intervals defined by dividing "Time Period of the consecutive photographing operation to be continued after disconnection of the wireless communication" by "Number of images for consecutive photographing after disconnection of the wireless communication". When the count of the consecutive photographing is zero (S22: YES), the process proceeds to step S23 (End of consecutive photographing).

S23 in FIG. 2B (Termination of Consecutive Photographing)

The step S23 is executed when the consecutive photographing end command transmitted by the smartphone 20 is received (S14: YES) or when the count of the consecutive photographing reaches zero (S22: YES). In step S23, the consecutive photographing is terminated in accordance with the consecutive photographing end command when the determination result of step S14 is YES or is terminated in accordance with the operation control setting for the time of disconnection of wireless communication when the determination result of S22 is YES. In response to termination of the consecutive photographing, the process shown in FIGS. 2A and 2B is also terminated.

As described above, according to the embodiment of the invention, even when the imaging apparatus 10 is in the state where the wireless communication with the smartphone 20 is disconnected and thereby the imaging apparatus 10 is not able to receive the control signal, execution of operation (e.g., the consecutive photographing operation) regarding photographing can be controlled.

The foregoing is the explanation about the embodiment of the invention. The invention is not limited to the above described embodiment, but can be varied in various ways within the scope of the invention. For example, the invention includes a combination of embodiments explicitly described in this specification and embodiments easily realized from the above described embodiment.

This application claims priority of Japanese Patent Application No. P2013-213747, filed on Oct. 11, 2013. The entire subject matter of the application is incorporated herein by reference.

What is claimed is:

1. An imaging apparatus, comprising:
   a communication unit configured to communicate with an external device;

an operation control unit configured to control execution of predetermined operation concerning photographing in accordance with a control signal received from the external device; and a detection unit configured to detect disconnection of communication with the external device;

wherein the operation control unit is configured to control execution of the predetermined operation in accordance with a predetermined operation control setting when disconnection of the communication with the external device is detected during execution of the predetermined operation;

wherein, when the communication with the external device is valid, the operation control unit is configured to:

start the predetermined operation in accordance with a start command for the predetermined operation received from the external device; and terminate execution of the predetermined operation in accordance with an end command for the predetermined operation received from the external device;

wherein, when the communication with the external device is disconnected during execution of the predetermined operation, the operation control unit is configured to terminate execution of the predetermined operation after executing the predetermined operation in accordance with the predetermined operation control setting for one of a predetermined time period and a predetermined number of images to be photographed; and wherein, when restoring of the communication with the external device is detected before the predetermined time period has elapsed or photographing for the predetermined number of images has finished, the operation control unit is configured to reset a counter for counting one of the predetermined time period and the predetermined number of images to be photographed.

2. The imaging apparatus according to claim 1, further comprising:

an operation unit configured to receive a user operation for setting the predetermined operation control setting.

3. The imaging apparatus according to claim 1, further comprising:

a storage medium in which the predetermined operation control setting has been stored in advance.

4. The imaging apparatus according to claim 1;

wherein, when the communication with the external device is disconnected during execution of the predetermined operation, the operation control unit is configured to terminate execution of the predetermined operation after executing the predetermined operation in accordance with the predetermined operation control setting for the predetermined time period.

5. The imaging apparatus according to claim 1;

wherein the predetermined operation comprises consecutive photographing operation, bulb photographing operation and moving image photographing operation.

6. An operation control terminal device for controlling execution of predetermined operation by an imaging apparatus, comprising:

a communication unit configured to communicate with the imaging apparatus;

a display unit configured to display a setting screen for an operation control setting used to control execution of the predetermined operation by the imaging apparatus when, on the imaging apparatus, disconnection of communication with the operation control terminal device is detected during execution of the predetermined operation; and an operation unit configured to receive a user operation to the setting screen for the operation control setting displayed on the display unit;

wherein the communication unit is configured to cause the imaging apparatus to set the operation control setting by transmitting, to the imaging apparatus, an operation result of the user operation to the setting screen for the operation control setting displayed on the display unit;

wherein, when the communication with the imaging apparatus is valid, the communication unit is configured to:

cause the imaging apparatus to start the predetermined operation in accordance with a start command for the predetermined operation transmitted to the imaging apparatus; and cause the imaging apparatus to terminate execution of the predetermined operation in accordance with an end command for the predetermined operation transmitted to the imaging apparatus;

wherein the operation control setting causes the imaging apparatus to terminate execution of the predetermined operation after executing the predetermined operation for one of a predetermined time period and a predetermined number of images to be photographed when, on the imaging apparatus, disconnection of the communication with the operation control terminal device is detected during execution of the predetermined operation; and wherein the operation control setting causes the imaging apparatus to reset a counter for counting one of the predetermined time period and the predetermined number of images to be photographed when, on the imaging apparatus, restoration of the communication with the operation control terminal device is detected before the predetermined time period has elapsed or photographing for the predetermined number of images has finished.

7. The operation control terminal device according to claim 6;

wherein the operation control setting causes the imaging apparatus to terminate execution of the predetermined operation after executing the predetermined operation for the predetermined time period when, on the imaging apparatus, disconnection of the communication with the operation control terminal device is detected during execution of the predetermined operation.

8. The operation control terminal device according to claim 6;

wherein the predetermined operation comprises consecutive photographing operation, bulb photographing operation and moving image photographing operation.

9. A non-transitory computer readable medium having computer readable instruction stored thereon, which, when executed by a processor of a device for controlling execution of predetermined operation by an imaging apparatus, configures the processor to perform:

displaying a setting screen for an operation control setting used to control execution of the predetermined operation by the imaging apparatus when, on the imaging apparatus, disconnection of communication with an external device is detected during execution of the predetermined operation; and setting the operation control setting in accordance with a user operation to the setting screen for the operation control setting;

wherein the operation control setting causes the imaging apparatus to terminate execution of the predetermined operation after executing the predetermined operation for one of a predetermined time period and a predetermined number of images to be photographed when, on the imaging apparatus, disconnection of the communication with the external device is detected during execution of the predetermined operation; and wherein the operation control setting causes the imaging apparatus to reset a counter for counting one of the predetermined time period and the predetermined number of images to be photographed when, on the imaging apparatus, restoration of the communication with the external device is detected before the predetermined time period has elapsed or photographing for the predetermined number of images has finished.

10. The non-transitory computer readable medium according to claim 9;

wherein the operation control setting causes the imaging apparatus to terminate execution of the predetermined operation after executing the predetermined operation for the predetermined time period when disconnection of the communication with the external device is detected during execution of the predetermined operation.

11. The non-transitory computer readable medium according to claim 9;

wherein the predetermined operation comprises consecutive photographing operation, bulb photographing operation and moving image photographing operation.

12. An operation control system, comprising:
an operation control setting server;
an operation control terminal device; and
an imaging apparatus;
the operation control setting server comprising:
a predetermined operation control setting content;
the operation control terminal device comprising:
a display unit configured to receive the predetermined operation control setting content from the operation control setting server and display the predetermined operation control setting content;
an operation unit configured to receive a user operation to the predetermined operation control setting content displayed by the display unit; and
a transmission unit configured to transmit, to the imaging apparatus, an operation result with respect to the predetermined operation control setting content; and
the imaging apparatus comprising:
an operation control unit configured to control execution of predetermined operation concerning photographing in accordance with a control signal received from the operation control terminal device; and
a setting unit configured to set predetermined operation control setting in accordance with the operation result with respect to the predetermined operation control setting content received from the operation control terminal device;

wherein the operation control unit is configured to control execution of the predetermined operation in accordance with the predetermined operation control setting when disconnection of communication with the operation control terminal device is detected during execution of the predetermined operation;

wherein, when the communication with the operation control terminal device is valid, the operation control unit is configured to:
start the predetermined operation in accordance with a start command for the predetermined operation received from the operation control terminal device; and
terminate execution of the predetermined operation in accordance with an end command for the predetermined operation received from the operation control terminal device;

wherein the predetermined operation control setting causes the imaging apparatus to terminate execution of the predetermined operation after executing the predetermined operation for one of a predetermined time period and a predetermined number of images to be photographed when, on the imaging apparatus, disconnection of the communication with the operation control terminal device is detected during execution of the predetermined operation; and wherein the predetermined operation control setting causes the imaging apparatus to reset a counter for counting one of the predetermined time period and the predetermined number of images to be photographed when, on the imaging apparatus, restoration of the communication with the operation control terminal device is detected before the predetermined time period has elapsed or photographing for the predetermined number of images has finished.

13. The operation control system according to claim 12;
wherein the operation control setting server is provided in the imaging apparatus.

14. The operation control system according to claim 12;
wherein the predetermined operation control setting causes the imaging apparatus to terminate execution of the predetermined operation after executing the predetermined operation for the predetermined time period when, on the imaging apparatus, disconnection of the communication with the operation control terminal device is detected during execution of the predetermined operation.

15. The operation control system according to claim 12;
wherein the predetermined operation comprises consecutive photographing operation, bulb photographing operation and moving image photographing operation.

* * * * *